United States Patent [19]

Salaun et al.

[11] 4,100,259
[45] Jul. 11, 1978

[54] PROCESS AND APPARATUS FOR THE PURIFICATION OF FUMES AND GASES AND FOR THE PRODUCTION OF SULFURIC ACID

[75] Inventors: André Salaün, Saint-Ouen; René Trempu, Gambais, both of France

[73] Assignee: Compagnie Industrielle des Telecommunications Cit-Alcatel, France

[21] Appl. No.: 734,526

[22] Filed: Oct. 21, 1976

Related U.S. Application Data

[63] Continuation of Ser. No. 491,658, Jul. 25, 1974, abandoned.

[30] Foreign Application Priority Data

Jul. 26, 1973 [FR] France ............................. 73 27426
May 14, 1974 [FR] France ............................. 74 16616
Jun. 17, 1974 [FR] France ............................. 74 20910
Jun. 26, 1974 [FR] France ............................. 74 22251

[51] Int. Cl.² ...................... C01B 17/00; C01B 17/72
[52] U.S. Cl. ...................................... 423/242; 423/522
[58] Field of Search ............... 423/522, 530, 533, 242, 423/244

[56] References Cited

U.S. PATENT DOCUMENTS

| | | | |
|---|---|---|---|
| 2,021,936 | 11/1935 | Johnstone | 423/242 |
| 2,113,198 | 4/1938 | Monhebel | 423/242 |
| 2,342,704 | 2/1944 | Striplin, Jr. | 423/529 |
| 3,226,192 | 12/1965 | Atsukawa | 423/530 |
| 3,318,662 | 5/1967 | Pauling | 423/522 |
| 3,710,548 | 1/1973 | Coughlin | 423/533 |
| 3,752,884 | 8/1973 | Sasse | 423/522 |
| 3,836,630 | 9/1974 | Noguchi | 423/522 |
| 3,947,560 | 3/1976 | Nambu et al. | 423/522 |

OTHER PUBLICATIONS

Tarbutton et al., Recovery of Sulfur Dioxide from Flue Gases, I&EC vol. 49, pp. 392–395, Mar. 1957.
Copson et al., Recovery of Sulfur Dioxide as Dilute Sulfuric Acid, I&EC vol. 25, #8, Aug. 1933, pp. 909–916.

*Primary Examiner*—Earl C. Thomas
*Assistant Examiner*—Gary P. Straub
*Attorney, Agent, or Firm*—Craig & Antonelli

[57] ABSTRACT

A process for purifying combustion gases by removing the sulfur dioxide which they contain and for producing sulfuric acid, consisting in rinsing said gases by means of an aqueous solution capable of oxidizing said sulfur dioxide, said rinsing operation being effected in the presence of oxygen, characterized in that said aqueous rinsing solution comprises at least one element capable of combining with said sulfur dioxide to form within the aqueous solution and in the presence of sulfuric acid a sulfur type intermediate coordination complex capable of cooperating with oxygen and said element to produce at least one oxidizing compound (product) capable of oxidizing said sulfur dioxide at a rapid rate.

19 Claims, 3 Drawing Figures

PROCESS AND APPARATUS FOR THE PURIFICATION OF FUMES AND GASES AND FOR THE PRODUCTION OF SULFURIC ACID

This is a continuation, of application Ser. No. 491,658 filed July 25, 1974 now abandoned.

The present invention relates to a process for purifying fumes and gases and for producing sulfuric acid from the sulfuretted compounds extracted from the fumes and from the gases.

The problem posed by the purification of fumes and gases into sulfur derivatives is well-known. Such a problem exists particularly in the case of plants which consume a fuel such as fuel oil or gas oil, in which the sulfuretted derivatives content may be substantial.

Among the chemical purification processes, it has been particularly suggested to oxidize the sulfur dioxide resulting from combustion, using a ferric sulfate solution.

In such a process, the sulfur dioxide is converted into sulfuric acid while the ferric sulfate is reduced to the state of ferrous sulfate. This ferrous sulfate is reoxidized into ferric sulfate during the course of a subsequent phase in which air is bubbled through the solution, and is neutralized by iron and particularly the iron oxides. Excess iron salts resulting from the process are extracted from the solution by evaporation and crystallization, in the form of ferric sulfate. After drying, such a sulfate is calcined to give iron oxides which are recycled, and sulfur dioxide which may be used for sulfuric acid synthesis or for the preparation of pure sulfur.

However, such processes have a number of drawbacks:

In particular, it is found that in the conditions previously stated, the rate of oxidation of the sulfur dioxide is low, above all in a medium with a very low pH value. Consequently, the washing columns in which the gases and the solutions are brought into contact have to be of considerable dimensions.

Moreover, the extraction of the ferric sulfate from the solution, its calcination with a view to recovering the iron oxides and the sulfur dioxide, the conversion of this latter gas into commercial sulfuric acid, constitute operations which are complicated from the industrial point of view and costly.

Moreover, it is found that the sulfuric acid resulting from the oxidation of sulfur dioxide from fumes by ferric sulfate does in fact contain considerable proportions of dithionic acid resulting in disturbances in the purifying process.

The present invention makes it possible to remedy the major drawbacks outlined hereinabove and it has as its object a process which makes it possible, with a maximum yield, to purify fumes and gases into sulfurous derivatives; this by the use of a simple apparatus which occupies a minimum of space.

Moreover, the sulfurous derivatives thus extracted may easily and directly be converted into marketable concentrated sulfuric acid, with a minimum consumption of power.

Indeed, it has been found, following systematic tests, that if the gases or fumes to be purified and oxygen are simultaneously brought into contact with a solution containing a salt of an element such as cobalt, manganese or nickel, or a mixture of at least two of these elements, the result is one or more highly oxidizing compounds capable of oxidizing sulfur dioxide at a very high speed.

The inventors have succeeded in demonstrating the existence of such oxidizing agents by their reaction on potassium iodide and even on ferrous orthophenanthroline.

They attribute considerable importance as intermediate compound in the reaction to coordination complexes which could be of the type $(M^{3+}(SO_3)_3)^{3-}$. It is known that the existence of such a complex was demonstrated and its formula established in the case of cobalt. The explanation proposed is corroborated by the fact, established experimentally by the inventors, that the reaction does not always start by itself if the element M is present solely at valence $2+$ and that the addition of a trace of oxidizing agent, capable of carrying a small quantity of element M to the valence $3+$, is sometimes necessary. The sulfuric acid formed by such an oxidation process may be concentrated and provide a commercial grade by using just the heat supplied by the gases and the fumes.

An object of the invention therefore is a process for the purifying of fumes and gases of combustion by elimination of the sulfur dioxide formed by oxidation of the sulfur derivatives contained in a fuel and the concomitant production of sulfuric acid from the sulfur dioxide, a process comprising particularly the washing of the fumes and gases by an aqueous solution adapted to oxidize sulfur dioxide and form sulfuric acid, the washing being performed in the presence of oxygen, characterized in that the aqueous washing solution comprises at least one element which is capable of combining with the sulfur dioxide to form within the aqueous solution and in the presence of sulfuric acid an intermediate coordination complex of the sulfitic type, capable of cooperating with the oxygen and the element in order to produce at least one oxidizing compound capable of oxidizing the sulfur dioxide at a high rate.

This element is chosen from among manganese, nickel and cobalt:

Advantageously, the element is manganese.

According to a characteristic feature of the invention, a mixture of at least two of the elements is used.

Moreover, it is found in certain cases that the rate of oxidation of the sulfur dioxide by the washing solution is very rapid at the start of the purifying process, then diminishes substantially; the purifying process thus losing a part of its efficacy. It has been found that it was sufficient, on the one hand, to leave the solution to stand for a certain time in order that it might resume its initial efficacy, and on the other, that the solution should be prepared, before use, according to a specific procedure.

Consequently, according to the invention, the aqueous washing solution is prepared in the following successive stages:

an homogeneous mixture comprising 0.5 to 10 g/liter of an oxide of the element, e.g. manganese oxide, 20 to 500 g/liter of a sulfate of the element, 100 to 1000 g/liter of sulfuric acid, is prepared in an aqueous medium, accompanied by agitation for at least 30 minutes;

the mixture is diluted in water or in a solution of sulfuric acid so that the resultant aqueous solution contains 10 to 20 g/liter of the sulfate and at least 100 g/liter of sulfuric acid.

According to the invention, following the preparation of the mixture, and prior to dilution, filtration is performed to separate the oxide.

According to the invention, and after periods of time comprised of substantially between 30 and 60 minutes approximately a fraction of the aqueous washing solution comprising between a quarter and a half of the total volume of solution involved in the purification process, is withdrawn from contact from the fumes and gases and left to stand for at least 1 hour, substantially, and then reintroduced into contact with the fumes and gases.

According to another feature of the invention, a fraction of the washing solution corresponding to the quantity of sulfur dioxide absorbed is extracted and replaced by a corresponding quantity of fresh solution in order to maintain constant a concentration of the washing solution in sulfuric acid, the fraction of the washing solution extracted being cleansed of solid particles resulting from combustion by filtration, characterized in that the solution is concentrated under low pressure, the element being precipitated in the form of a sulfate and separated from the concentrated sulfuric acid.

According to another feature of the invention, at least a part of the gases or fumes are allowed to bubble through the fraction of the washing solution.

According to the invention, after bubbling through a part of the washing solution, the part of the gases and fumes is mixed with the initial residual fraction after this latter has been mixed with air.

According to an alternative embodiment, after bubbling through a part of the washing solution, the part of the gases and fumes is mixed with the initial residual fraction prior to this latter being mixed with air.

Moreover, it has been found that the soot and smoky charcoal carried by the fumes and gases contains various components, particularly phenols, which, after a certain period of operation inhibit formation of the heretofore described complex. The result is a substantial upset in the process and a lessening in the efficiency of purification.

The process according to the invention is therefore furthermore characterized in that prior to the washing, and at the introduction of oxygen into the fumes and gases, they are pre-washed, particulary with a view to eliminating the soot and smoky charcoal entrained by the fumes and gases, such pre-washing being carried out by means of a fraction of the aqueous washing solution.

According to a feature of the invention, the fraction of aqueous washing solution intended particularly to eliminate the soot and smoky charcoal carried by the fumes and gases corresponds to the quantity of sulfur dioxide oxidized and is replaced by a corresponding quantity of fresh solution in order to maintain the concentration of sulfuric acid in the washing solution constant.

According to a further feature of the invention, the fraction of aqueous washing solution which is intended to eliminate the soot and smoky charcoal carried by the fumes and gases is subsequently concentrated during the course of the pre-washing; cleansed of the soot and smoky charcoal by filtration, concentrated again under low pressure, the element being precipitated in sulfate form and separated from the concentrated sulfuric acid.

According to another feature of the invention, certain resultant manganese compounds of valences higher than $2^+$ and contained in the fraction of aqueous washing solution are reduced by the sulfur dioxide during the course of said pre-washing.

In certain cases, it is found that the reaction to the purifying process stops when the flow of sulfur dioxide exceeds a critical level which is dependent upon the working conditions.

Consequently, according to the invention, determination of the optimum values of the main parameters of the purifying process, viz:
the section of the tower in which the aqueous solution washes the fumes and gases;
the height of the lining provided in the tower and capable of ensuring contact between the fumes and gases on the one hand and the aqueous washing solution on the other;
the rate of flow of the aqueous washing solution;
the oxygen concentration in the fumes and gases; is carried out according to the following successive phases:

(A) A type of lining is chosen which has a predetermined specific surface area.

(B) The rates of flow of fumes and gas and of solution which give a predetermined value for loss of head are determined for various types of the lining, according to (A), per unit of section.

(C) The volume of dynamic retention of this lining per unit of section is determined as a function of the rates of flow of solution, and for each of the various types of lining according to (B).

(D) The rates of flow of sulfur dioxide in the fumes and gases capable of being oxidized are calculated per unit of column section, according to various oxygen concentrations in the gases for each of the values of the volume of dynamic retention determined according to (C).

(E) The rates of flow of fumes and gases corresponding to the said flows of sulfur dioxide according to (D) are calculated and those values are chosen for which the loss of head has the value predetermined according to (B).

(F) From the values obtained according to (E), those are chosen for which the flow of sulfur dioxide shows a maximum value per unit of section, and, as under (E), the oxygen concentration, the flow of aqueous washing solution and the height of the lining are determined.

the It is necessary to determine:
-the section of the washing tower by the ratio of the maximum rate of flow of sulfur dioxide in the fumes are gases and the maximum rate of flow of sulfur dioxide according to (F);
the height of lining according to (F),
the said rate of flow of aqueous washing solution by the product of rate of flow of aqueous washing solution according to (F) by the section of the tower;
the concentration of oxygen in the gases according to (F).

According to another characteristic of the invention, contact between the fumes and gases on the one hand and the washing solution on the other is carried out by means of Raschig rings.

According to another feature of the invention, contact between the fumes and gases on the one hand and the washing solution on the other is brought about directly by dispersions of the washing solution.

Advantageously, the said predetermined loss of head is 60 mm. water.

According to the invention, the rates of flow of sulfur dioxide calculated according to (D) are substantially proportional to the square on the oxygen concentrations, on the one hand, and the volume of dynamic retention, on the other.

According to another feature of the invention, the concentration of sulfuric acid is performed by the heat provided by the fumes and gases.

According to an alternative embodiment, the concentration of sulfuric acid is performed by the heat provided by an external source, the heat provided by the fumes and gases being used to increse the rate of discharge of the purified gases and fumes.

The invention relates particularly to an apparatus for carrying out the method as described above. It likewise relates to a plant for purifying combustion gases and fumes and for the concomitant production of sulfuric acid comprising at least an apparatus according to the invention.

Further characteristic features and advantages of the invention will become manifest from the ensuing description, given by way of purely illustrative but in no way limitative example, reference being made therein to the attached drawings, in which.

Figure 1:
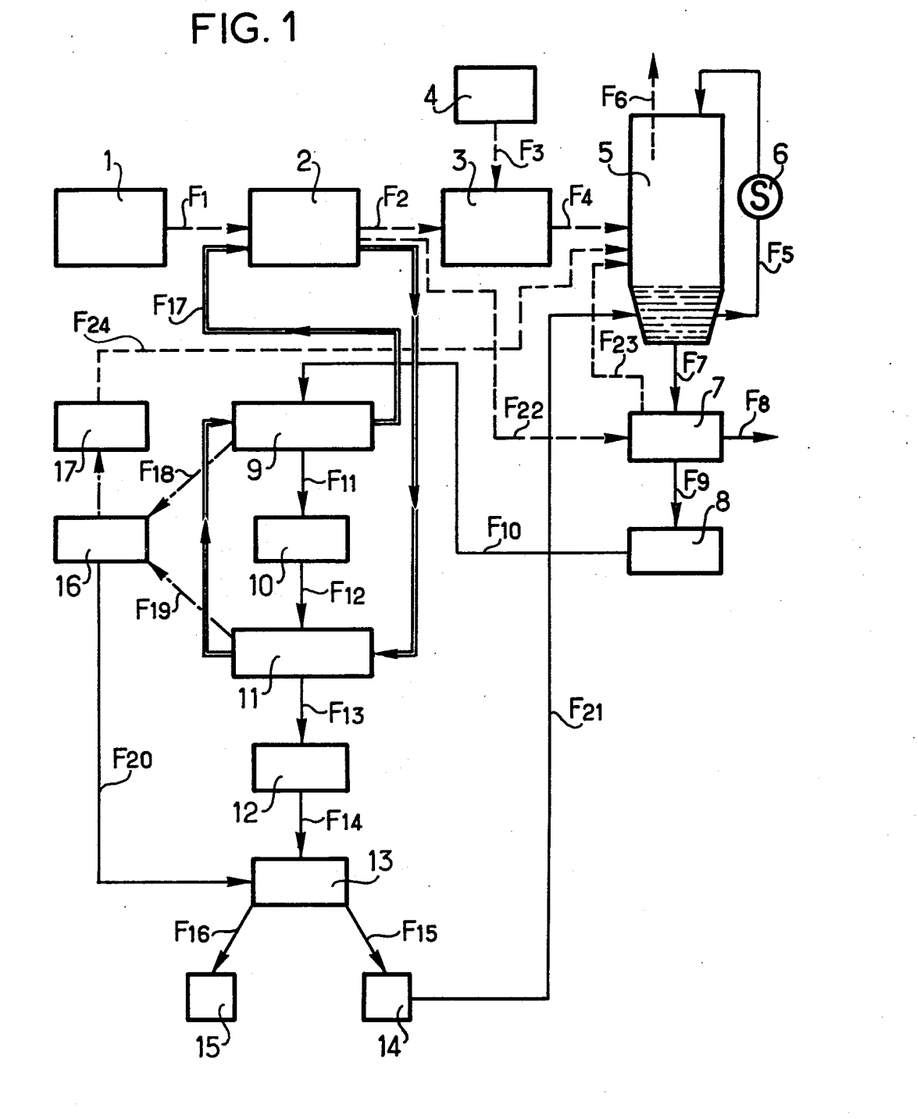
FIG. 1 illustrates a first embodiment of the process according to the invention.
Figure 2:
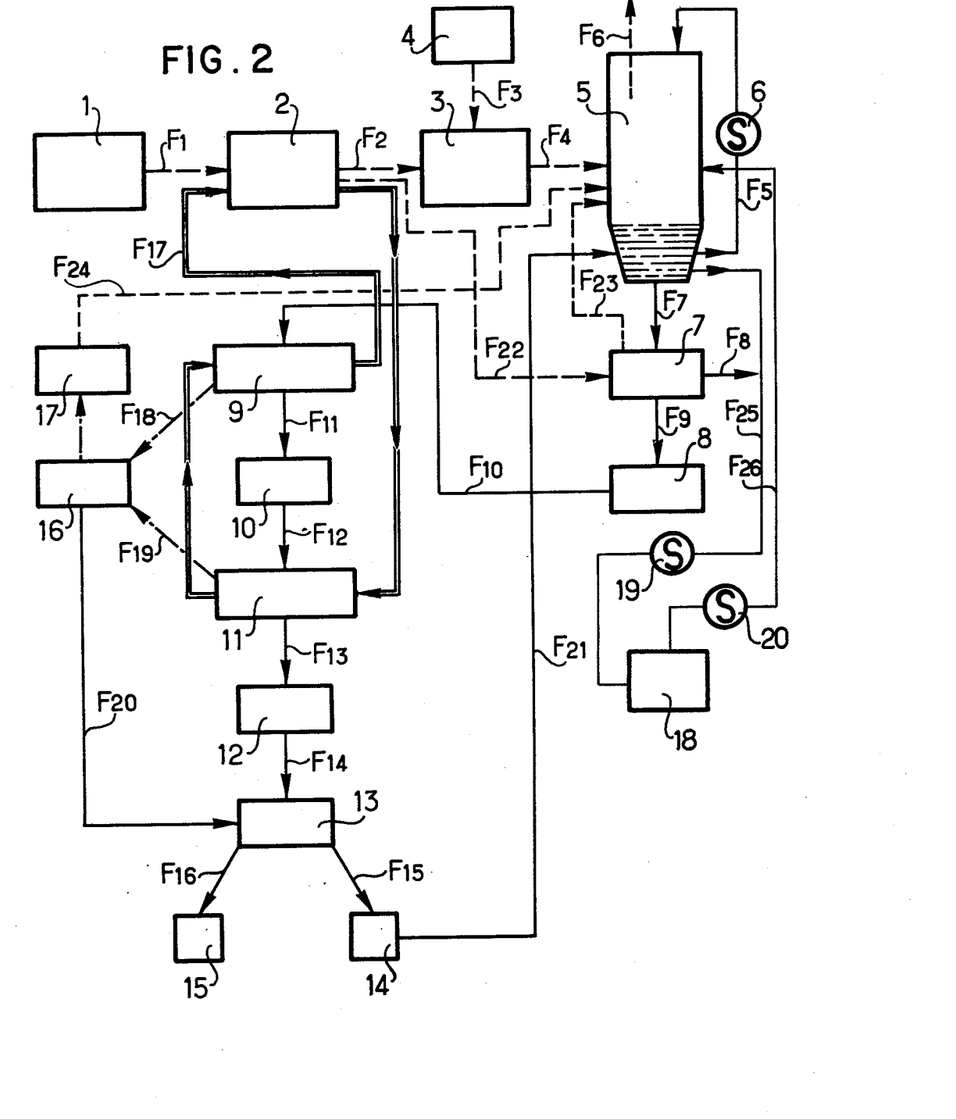
FIG. 2 illustrates a second embodiment of the process according to the invention.
Figure 3:
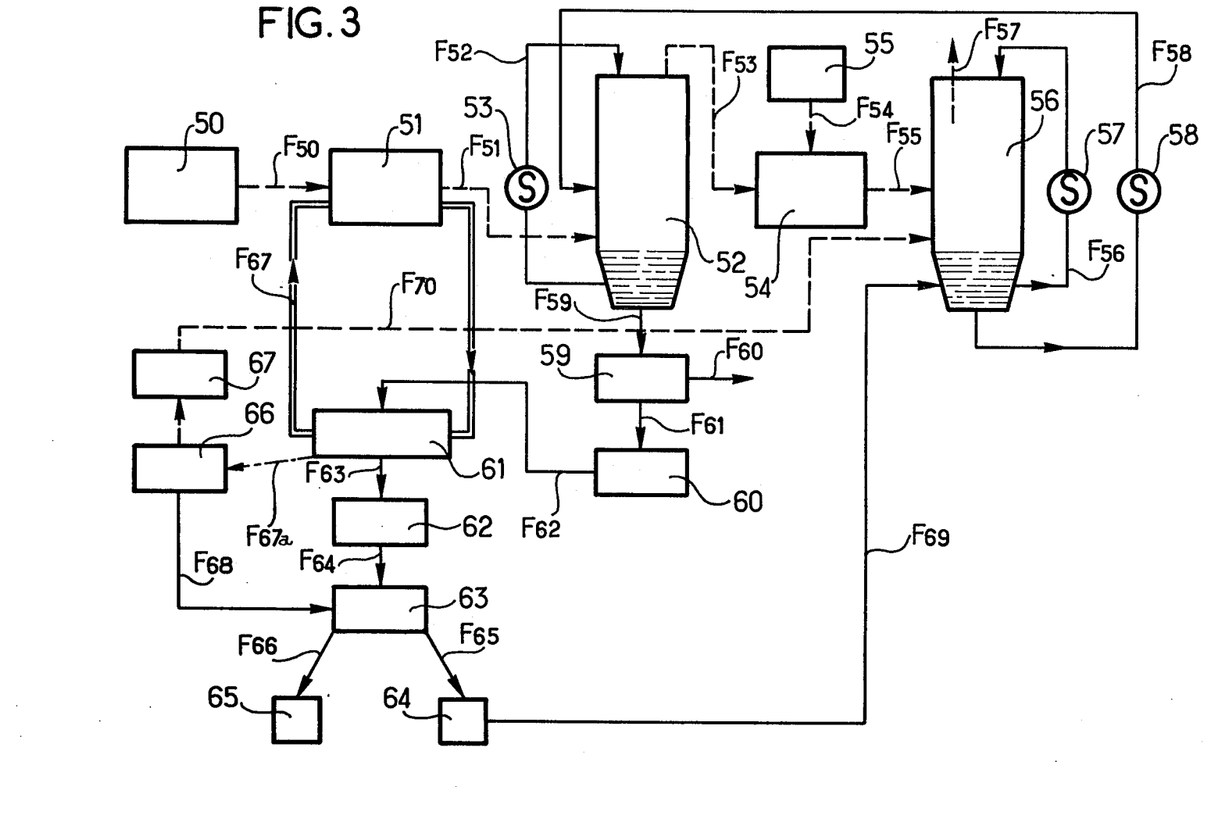
FIG. 3 illustrates a third embodiment of the process according to the invention.

Therefore, the drawings represent units for the purification of the fumes and gases into sulfur dioxide in which, and in no way implying limitation, manganese salts are used.

For greater ease of understanding, transferences (i.e. flows) of solution of suspensions or solids are shown in solid lines, while transferences of gases are shown by broken lines, transferences of water vapor by mixed lines and transferences of heat-bearing liquid by double lines.

FIG. 1 shows a first embodiment of the process with a boiler 1 consuming, for example, heavy fuel (No. 2). The hot combustion gases which result and which contain sulfur dioxide are conducted firstly to a heat exchanger 2 (the function of which will be explained hereinafter) according to the arrow F1, then into an enclosure 3 according to the arrow F2, in which they are mixed with the air emanating, for example, from a fan 4, such a flow of air being illustrated by the arrow F3. This mixture is then, according to arrow F4, transferred substantially to the base of a washing tower 5 which receives at the top the washing solution which is drawn off continuously at its bottom, such a circulation being ensured by means of a pump 6 and being illustrated by the arrow F5. The tower 5 is lined, for example, with Raschig rings (not shown) which are intended to ensure optimum contact between the gas to be purified and the washing solution, the purified gases being expelled into the ambient air, according to the arrow F6. The washing solution used contains manganese sulfate and sulfuric acid resulting from oxidation of the sulfur dioxide in the fumes, as will be explained hereinafter.

Furthermore, a part of the washing solution corresponding to the quantity of sulfuric acid resulting from oxidation of the sulfur dioxide is drawn off continuously at the base of the tower 5 and directed to a filter 7 as illustrated by the arrow F7, the filter having the task of eliminating the soot and smoky charcoal, which are evacuated as illustrated by the arrow F8. The arrow F9 indicates that the solution is transferred to a buffer tank 8, the object of which is to regularize the flow, then, as indicated by the arrow F10, to the first evaporator 9. The object of this evaporator is to achieve a primary concentration of the solution, which is then directed as indicated by the arrow F11 to a buffer tank 10, then according to the arrow F12, to a second evaporator 11 where it undergoes a second concentration. The solution which is thus concentrated is then passed according to the arrow F13 to a buffer tank 12, then according to the arrow F14, to a filter 13, the purpose of which is to separate on the one hand the manganese sulfate transferred into an enclosure 14 according to the arrow F15 and on the other the sulfuric acid which is concentrated and passed into a vessel 15 according to the arrow F16.

Moreover, the double lines F17 shows the circulation of a heat-bearing liquid directing the heat provided at the exchanger 2 by the gases and fumes, to the evaporators 9 and 11 where the sulfuric acid is concentrated. The water vapor resulting from such concentration is directed according to arrow F18 and arrow F19 to a condenser 16 and returned under reflux, therefore in liquid form, as indicated by the arrow F20, to the filter 13 where it is incorporated in the manganese sulfate precipitate which it restores to solution and carries into the chamber 14. This solution is in turn recycled according to the arrow F21 to the base of the washing tower 5. It will be noted that the condenser 16 and the evaporators 9 and 11 are maintained under low pressure by means of a vacuum pump 17.

Furthermore, the circuit F22 shows that at least a part of the combustion gases originating from the exchanger 2 are brought into contact with the solution from the filter 7, then introduced according to F23 at the base of the tower 5 together with the mixture from the chamber 3. According to an alternative embodiment, not shown, the gases emerging from 7 can be directed towards the inlet of 3.

Finally, the circuit F24 indicates that the air from the vacuum pump 17, and likely to comprise traces of solution, is introduced at the base of the tower 5.

Such a process may be explained as follows:

At the commencement of the purifying process, a solution of manganese sulfate, preferably with the addition of a small quantity of manganese dioxide, which encourages the triggering of the reaction, is introduced at the base of the tower 5. This solution is brought into contact, in the tower 5 (according to the arrow F5) with the gases mixed with the air and issuing from the chamber 3 as indicated by F4. The sulfur dioxide in the fumes or gases dissolves in the solution, forming a complex of formula $(Mn^{3+}(SO_3)_3)^3$, or similar which, in the presence of the oxygen in the air, produces at least a powerful oxidizing agent (perhaps a manganosulfate complex), which rapidly oxidizes the sulfur dioxide present in the solution in free, ionized or combined form, and converts it to sulfuric acid.

Therefore, the sulfuric acid titre in the washing solution increases. When it reaches a predetermined level, therefore in a period of continuous operation, a rate of flow of solution corresponding to the sulfur dioxide absorbed starts to be extracted from the base of the tower 5. Consequently, the content of sulfuric acid in the washing solution remains constant.

The solution thus extracted, filtered at 7 as previously indicated, routed according to F10, is concentrated in the evaporators 9 and 11 to produce concentrated sulfuric acid at 15. The manganese sulfate collected at 14 after filtration at 13 of the solution extracted continuously from the tower 5 receives, according to F20, water originating from the concentration and condensed at 16 as indicated above. Such a solution is recycled to the tower 5 according to the circuit F21. It should likewise be noted that the concentration of sulfuric acid in the washing solution (and in the solution concentrated in the evaporators 9 and 11), is such that the mere heat in the fumes is adequate to obtain at 15 a marketable sulfuric acid with no need for any outside supply of additional heat.

Moreover, it has been pointed out hereinabove that at least a part of the gases was, according to F22, brought into contact with the extracted solution at 7 before being directed according to F23 to the base of the tower 5. The effect of such an operation is to reduce certain resultant manganese compounds, for example of valences $Mn^{3+}$ and $Mn^{7+}$, which may under certain conditions prejudice the operational procedure of concentration or separation, or may pollute the acid produced.

In order to ensure clarity, but by no way implying limitation, a concrete example is given below of a gas-washing and purifying unit constructed by the applicants according to such a first form of embodiment according to the invention.

Heavy No. 2 fuel containing 3.5% sulfur is consumed in the Boiler 1.

The gases and fumes from 1 entering the exchanger 2 are at a temperature of 160°, contain a 30% excess of air and have the following composition and rates of flow:

| | | |
|---|---|---|
| $CO_2$ | : 477 | cu.m/hr. |
| $H_2O$ | : 369 | " |
| $N_2$ | : 3347 | " |
| $O_2$ | : 214 | " |
| $SO_2$ | : 7.5 | " |

In order words a total rate of flow of 4414 cu./m/hr.

The gas emerging from the exchanger 2 is at a temperature of approximately 80° C.

In the chamber 3, the gases and fumes receive air at a rate of 6000 cu.m/hr.

At the outlet from the chamber 3, the gases have the following compositions and rates of flow:

| | | |
|---|---|---|
| $CO_2$ | : 477 | cu.m/hr. |
| $H_2O$ | : 369 | " |
| $N_2$ | : 8087 | " |
| $O_2$ | : 1474 | " |
| $SO_2$ | : 7.5 | " ; | in other words a total of 10415 cu.m/hr.

The purified gases discharged from the tower 5 according to F6 are of substantially identical composition and exhibit substantially the same rate of flow as those previously mentioned, except:

$SO_2$:1 p.p.m. or 0.01 cu.m/hr. (maximum values).

The percentage of gases admitted according to the circuit 22 represent approximately 10% of the flow of gases entering the chamber 3.

During a period of continuous operation, the washing solution routed according to F5 exhibits the following composition and rate of flow:

| | |
|---|---|
| Manganese or equivalent $MnSO_4$: | 20 g/l |
| $H_2SO_4$ | 150 ± 10 g/l | and for a rate of flow of 200 cu. m/hr.

The solution extracted from the tower 5 according to F7 has a composition comparable with the previous one, but a rate of flow of only 200 l/hr.

The sulfuric acid is obtained at 15 with a rate of flow of 20.8 l/hr. and has a density of 1.73, a concentration of the order of 80% and contains approximately 6 g/l $MnSO_4$, which will have to be periodically replaced.

The solution collected at 14 and recycled according to F21 circulates at the rate of 200 liters and 3.875 kg $MnSO_4$/hr.

Now, with regard to the various parts of the apparatus, these are made from materials which are capable of withstanding attack by the various fluids involved and may particularly be of polyvinyl chloride. Their main characteristics are given below:

| | |
|---|---|
| Tower 5 | : Height 3 m., diameter 2.9 m., lined with Raschig rings over a height of 1 m. |
| Pump 6 | : Rate of flow 200 cu. m./hr. at 4 m. height. |
| Filter 7 | : Continuous type, with automatic washing of the filtering unit. |
| Evaporator 9 | : Concentrates $H_2SO_4$ to 60% in a vacuum of 30 mmHg. |
| Evaporator 11 | : Concentrates $H_2SO_4$ to 80% in a vacuum of 30 mmHg. |

Filter 13: Of the drum or horizontal segments type.
Vacuum pump 17: Rate of flow 400 cu. m/hr. under 30 mmHg.
Exchanger 2: Of the 2-stage type, temperatures 120° and 80%. Heat-bearing liquid: oil.
Fan 4: Rate of flow 6000 cu. m./hr. under 50 mm of water.

In the second embodiment illustrated in FIG. 2, there is shown as in the previous case a Boiler 1 which consumes, for example, a heavy fuel, No. 2. The hot combustion gases which result contain sulfur dioxide and are passed firstly to a heat exchanger 2 (the function of which will be explained hereinafter) according to the arrow F1 and then into a chamber 3 according to the arrow F2, in which they are mixed with air provided, for example, by a fan 4, such a flow of air being represented by the arrow F3. This mixture is then transferred according to the arrow F4 substantially to the base of a washing tower 5 which receives at its top the washing solution which is drawn off continuously from its base, this circulation being provided by a pump 6 and being illustrated by the arrow F5. The tower 5 is lined for example with Raschig rings (not shown), the object of which is to ensure optimum contact between the gas to be purified and the washing solution, the purified gases being expelled into the ambient atmosphere according to the arrow F6. The washing solution used contains in particular manganese sulfate and sulfuric acid resulting from oxidation of the sulfur dioxide in the fumes, as will be explained hereinafter.

Furthermore, a part of the washing solution corresponding to the quantity of sulfuric acid resulting from oxidation of the sulfur dioxide is drawn off continuously from the base of the tower 5 and directed towards a filter 7 as indicated by the arrow F7, the purpose of the filter being to eliminate the soot and charcoal, which are carried off according to the arrow F8. The arrow F9 indicates that the solution is being transferred to a buffer tank 8, the object of which is to regularize the flow, then, according to the arrow F10, to a first evaporator 9. The object of this evaporator is to ensure a primary concentration of the solution, which is then routed according to the arrow F11 to a buffer tank 10, then according to the arrow F12 to a second evaporator 11 in which it undergoes a second stage of concentration. Thus concentrated, the solution is then directed according to the arrow F13 to a buffer tank 12 then, according to the arrow F14, to a filter 13, the object of which is to separate, on the one hand, the manganese sulfate transferred to a chamber 14 according to the arrow 15, and on the other, the concentrated sulfuric acid which is passed to a container 15 according to the arrow F16.

Furthermore, the double lines F17 represent the circulation of a heat-carrying liquid conveying the heat provided to the exchanger 2 by the gases and fumes, to the evaporators 9 and 11 where the concentration of the sulfuric acid is performed. The water vapor arising from such a concentration is passed according to the arrows 18 and F19 to a condenser 16 and flows back therefore in liquid form according to F20 towards the filter 13 where it is incorporated into the precipitated manganese sulfate which it returns to solution and carries into the chamber 14. This solution is in turn recycled according to the arrow F21 to the base of the washing tower 5. It will be noted that the condenser 16 and the evaporators 9 and 11 are maintained under low pressure by means of a vacuum pump 17.

Furthermore, the circuit F22 shows that part of the combustion gases originating from the exchanger 2 are brought into contact by bubbling with the solution from the filter 7, then introduced according to F23 at the base of the tower 5 together with the mixture originating from the chamber 3. According to an alternative embodiment, not shown, the gases emerging from 7 may be directed towards the intake of chamber 3.

The circuit F24 indicates that the air from the vacuum pump 17 and likely to carry traces of solution is introduced at the base of the tower 5.

Moreover, in accordance with this second embodiment, a vat 18 is capable of receiving a certain fraction, for example a quarter, of the washing solution used in the tower 5, the fraction remaining at rest or maturing in this vat for a certain time, as will be explained hereinafter. For this purpose, the solution is transferred to the vat by means of a first pump 19 according to the arrow F25, while a second pump 20 transfers the thus-matured solution again to the tower 5, as indicated by the arrow F26.

Such a process may be explained as follows: at the onset of the purifying process, a washing solution prepared according to this embodiment is introduced into the base of the tower 5.

Such a washing solution is obtained in the following way: For approximately 1 hour, a mixture formulated substantially as follows is stirred:

Hydrated manganese dioxide ($MnO_2, H_2O$): 10 g
Hydrated manganese sulfate($MnSO_4, H_2O$): 100 g
Sulfuric acid ($H_2SO_4$) : 500 g
Water ($H_2O$) quantity sufficient for : 1 liter This is filtered in order to separate the manganese dioxide.

The oxidizing agent contained in the filtrate, determined by a measurement of optical density, is 51 milliequivalents of oxygen per liter.

Another formula of the mixture is as follows:

| | | | |
|---|---|---|---|
| $MnO_2, H_2O$ | : | 0.5 | g |
| $H_2SO_4, H_2O$ | : | 100 | g |
| $MnSO_4$ | : | 500 | g |
| $H_2O$ | : | quantity sufficient for 1 liter. | |

This is stirred for 30 minutes and filtered.

The contents in terms of oxidizing agents are 9.2 milliequivalents of oxygen per liter.

It is also possible to use of the following mixture:

| | | | |
|---|---|---|---|
| $MnO_2, H_2O$ | : | 0.6 | g |
| $MnSO_4, H_2O$ | : | 80 | g |
| $H_2SO_4$ | : | 200 | g |
| $H_2O$ | : | quantity sufficient for 1 liter. | |

This mixture is stirred for 1 hour and filtered.

The contents of oxidizing agent is 4.7 milliequivalents of oxygen per liter.

It should be noted, however, that it is possible not to separate the manganese dioxide. In this case, filtration is therefore omitted.

Of course, the proportions given above, by way of example, may vary within the following limits:

| | | | |
|---|---|---|---|
| $MnO_2, H_2O$ | : | 0.5 | to 10 g |
| $MnSO_4, H_2O$ | : | 20 | to 500 g |
| $H_2SO_4$ | : | 100 | to 1,000 g |
| $H_2O$ | : | quantity sufficient for 1 liter | |

Whatever the mixture used, the washing solution introduced at the base of the tower 5 at the start is constituted by the filtrate obtained as indicated above by dilution in water or in a sulfuric solution so that the said washing solution is substantially formulated as follows:

| | | |
|---|---|---|
| $MnSO_4$ | : | 1 to 20 g/l |
| $H_2SO_4$ | : | 100 g/l at least | possibly with manganese dioxide if filtration has not been performed.

As indicated above, this solution is brought into contact i the tower 5 (according to the arrow F5) with the gases mixed with air and emanating from the chamber 3 according to F4. The sulfur dioxide in the fumes or gases is dissolved in the solution, forming a complex of formula $(Mn^{3+}(SO_3)_3)^{3-}$ or similar which, in the presence of the oxygen in the air and manganese produces at least a powerful oxidizing agent which rapidly oxidizes the sulfur dioxide present in the solution in free, ionized or combined form, and converts it to sulfuric acid.

The sulfuric acid content of the washing solution therefore increases. When it reaches a predetermined level, thus over a period of continuous operation, it is necessary to start extracting from the base of the tower 5 a flow of solution corresponding to the sulfur dioxide absorbed. Consequently, the sulfuric acid content of the washing solution remains contant.

The solution which is thus extracted and filtered at 7 as previously indicated and passed according to the arrow F10 is concentrated in the evaporators 9 and 11 to produce concentrated sulfuric acid at 15. The manganese sulfate collected at 14 after filtering of the solution continuously extracted from the tower 5 at 13 receives, according to F20, water from the concentration stage and condensed at 16 as previously stated. Such a solution is recycled to the tower 5 according to the circuit F21. It must likewise be noted that the sulfuric acid concentration in the washing solution and in the solution concentrated in the evaporators 9 and 11 is such that just the heat in the fumes is adequate to obtain at 15 a concentrated sulfuric acid which can be marketed without the need for any external contribution of additional heat.

Moreover, it is pointed out hereinabove that at least a part of the gases are, according to F22, brought at 7 into contact with the extracted solution before being passed at F23 to the tower 5. The effect of such an operation is to reduce certain resultant manganese compositions, for example of valences $Mn^{3+}$ and $Mn^{7+}$ which may in certain conditions prejudice the operational process of concentration-separation, or may pollute the acid produced.

Furthermore, as mentioned hereinabove, it is in certain cases noted that the rate of oxidation of the sulfur dioxide by the washing solution, is very rapid when the purifying process is triggered, then falls substantially, this drop being manifest after a period of time of substantially 30 to 60 mins. However, as the inventors have been surprised to note, it is sufficient to leave the solution to stand for approximately 1 hour for the solution to regain its initial capacity for oxidation.

In order to explain such a phenomenon, the inventors have proposed the hypothesis that the solution might be the subject of a conversion or refining stage resulting from a reaction which takes place at a slow speed and which would be complete only after several days.

Such a conversion would not be an oxidation phenomenon because the bubbling of air through the solution does not accelerate the process, and the oxidation capacity of the solution does not vary substantially. This phenomenon might result from the conversion of a complex of the manganosulfitic type into another complex which is more active with regard to the reaction of oxidation of the $SO_3$ ions, or which might result from a modification of structure of the complexes present in the solution. At the end of this transformation, the spectrum of the solution in visible light is not altered in quality, but the optical densities increase considerably, and the inventors have found that the oxidizing activity of the catalytic solution with respect to sulfur dioxide is the greater as the optical density of the solution at 480–500 nanometers (for which wavelength the solution exhibits maximum absorption in the visible spectrum) becomes higher.

Thus, by way of example, there are provided the following results:

A washing solution prepared as previously stated contains after 10 hours of operation 140 g/l of $H_2SO_4$ and 20 milliequivalents of oxygen per liter. It has an optical density of 0.200 at 500 nanometers (nm).

At the end of 3 hours of rest, following stoppage of the passage of gases laden with $SO_2$, the optical density is 0.375 and after 96 hours, the optical density becomes 0.958. The content of oxidizing agents has remained at approximately 20 milliequivalents per liter. These phenomena of growth of activity in the catalytic solution by being left at a standstill are utilized in order to improve the gas purification system, to stabilize the process and reduce the dimensions of the washing columns and the rates of flow of solution needed for a given rate of flow of sulfur dioxide.

To this end, every 30 to 60 minutes of operation, approximately a quarter or half or an intermediate fraction of the volume of washing solution used is drawn off at the base of the tower 5, and introduced into the tank 18 according to F25 and by means of the pump 19. This solution is left to stand in the tank 18 for at least 1 hour, for example, for 1 to 3 hours. After this stage of inactivity or maturation, the solution is introduced again into the tower 5 by means of the pump 20, such a transfer being illustrated by the arrow F26.

Then, at the end of 30 to 60 minutes of operation, solution is again drawn off and so on according to the sequence as described hereinabove.

For purposes of clarification but by no means limitation, there will be set out hereinafter in conjunction with FIG. 2 an example of a gas-washing purifying unit constructed according to this embodiment, an example some details of which have already been described.

The boiler 1 consumes a No. 2 heavy fuel containing 3.5% sulfur. The gases and fumes emanating from 1 and penetrating the exchanger 2 are at a temperature of 160°, contain a 30% excess of air and have the following compositions and involve the following rates of flow:

| | | | |
|---|---|---|---|
| $CO_2$ | : | 477 | cu. m/hr. |
| $H_2O$ | : | 369 | " |
| $N_2$ | : | 3347 | " |
| $O_2$ | : | 214 | " |
| $SO_2$ | : | 7.5 | " ; | in other words a total rate of flow of 4414 cu.m/hr.

The temperature of the gases emerging from the exchanger 2 is approximately 80° C.

In the chamber 3, the gases exhibit the following compositions and rates of flow:

| | | | |
|---|---|---|---|
| $CO_2$ | : | 477 | cu. m/hr. |
| $H_2O$ | : | 369 | " |
| $N_2$ | : | 8087 | " |
| $O_2$ | : | 1474 | " |
| $SO_2$ | : | 7.5 | " ; | in other words a total rate of flow of 10415 cu.m/hr.

The purified gases discharged from the tower 5 according to F6 are of substantially identical composition and rates of flow as are those previously mentioned, with the exception of:

$SO_2$ : 1 p. p. m. or 0.01 cu.m/hr (maximum values).

The percentage of gases admitted according to the line F22 represents approximately 10% of the flow of gases entering the chamber 3.

In a period of continuous operation, the washing solution routed according to F5 exhibits the following composition and rate of flow:

| | | |
|---|---|---|
| Manganese or equivalent $MnSO_4$ | : | 20 g/l |
| $H_2SO_4$ | : | 150 ± 20 g/l | for a rate of flow of 200 cu.m/hr.

The solution extracted from the tower 5 according to F7 is of a composition comparable with the previous one, but the rate of flow in only 200 l/hr.

The sulfuric acid is obtained at 15 at a rate of 20.8 l/hr. and with a density of 1.73, a concentration of around 80% and contains approximately 6 g/l $MnSO_4$, which will need to be replaced periodically.

The solution collected at 14 and recycled at F21 circulates at the rate of 200 liters and 3.875 kg $MnSO_4$/hr.

In accordance with the method according to this embodiment, at the commencement of the purifying process, 5,000 liters of solution with a composition substantially the same as that indicated above and prepared in the manner previously described were introduced into the tower 5.

Moreover, in a period of continuous operation, 2000 liters of washing solution were drawn off at the base of the tower every 30 minutes and left to stand for 1 hour in the tank 18 before being returned to the tower.

Now, with regard to the various parts of the apparatus, these are, as mentioned previously, made up from material capable of resisting attack from the various media involved and are particularly made from polyvinyl chloride. Their main characteristics are given below:

- Tower 5 : Height 3 m, diameter 2.9 m, lined with Raschig rings over a height of 1 m.
- Pump 6 : Rate of delivery 200 cu.m/hr. at 4 m height.
- Filter 7 : Continuous type with automatic washing of the filtering element.
- Evaporator 9 : Concentrate $H_2SO_4$ to 60% under vacuum of 30 mmHg
- Evaporator 11 : Concentrate $H_2SO_4$ to 80% under vacuum of 30 mmHg
- Filter 13 : Of the drum or horizontal segment type
- Vacuum Pump 17 : Delivery 400 cu.m/hr. under 30 mmHG
- Exchanger 2 : Of the 2-stage type, at temperatures 120° and 80°C. Heat-carrying liquid: oil.
- Fan 4 : Delivery 6000 cu.m/hr. under 50 mm water.
- Tank 18 : Capacity 3000 liters.

In the third embodiment illustrated in FIG. 3, there is a boiler 50 consuming, for example, No. 2 heavy fuel. The resultant hot combustion gases containing sulfur dioxide are directed firstly to a heat exchanger 51 (the purpose of which will be explained hereinafter) according to the arrow or line F50, substantially to the base of a tower referred to as a pre-washing tower 52, according to the arrow 51, receiving at its top in particular the washing solution which is drawn off continuously from the base; such a circulation being ensured by means of a pump 53 and illustrated by the arrow F52. The pre-washing tower 52 is lined, for example, with Raschig rings (not shown) intended to ensure optimum contact between the gas and the washing solution.

The gases are then passed to a chamber 54 according to the arrow F23 in which they are blended with air emanating, for example, from a fan 55, such a flow of air being represented by the arrow F54. This mixture is then transferred according to the arrow F55 substantially to the base of a tower referred to as a washing tower 56 which receives at its top the washing solution drawn off continuously at the base, such a circulation being ensured by means of a pump 57 and illustrated by the arrow F56. The tower 56 is likewise lined, for example, with Raschig rings (not shown) intended to ensure optimum contact between the gas to be purified and the washing solution. The purified gases are then expelled into the ambient atmosphere according to the arrow F57. The washing solution used contains manganese sulfate and sulfuric acid resulting from oxidation of the sulfur dioxide in the fumes, as will be explained hereinafter.

Furthermore, a part of the washing solution corresponds to the quantity of sulfuric acid resulting from oxidation of the sulfur dioxide in the fumes and gases is drawn off continuously at the base of the tower 56 and is directed into the pre-washing tower 52, such a transference being ensured by means of a dispensing pump 58, as indicated by the arrow F58.

The solution leaving the pre-washing tower 52 is then passed towards a filter 59 according to the arrow F59, the filter being intended to eliminate the soot and smoky charcoal discharged to the arrow F60. The arrow F61 indicates that the solution is being transferred to a buffer tank 60, the purpose of which is to regularize the flow, then, according to the arrow F67a, to an evaporator 61. The purpose of this evaporator is to ensure a second concentration of the solution (first having been carried out in the pre-washing tower 52), which is then routed according to the arrow F63 to a buffer tank 62, then according to the arrow F64, to a filter 63, the purpose of which is to separate, on the one hand, the manganese sulfate transferred into a chamber 64 according to the arrow F65 and on the other the concentrated sulfuric acid which is passed into a vessel 65 according to the arrow F66.

Furthermore, the double lines F67 represent the circulation of a heat-bearing liquid carrying the heat provided for the exchanger 51 by the gases and fumes to the evaporator 61 where the final concentration of the sulfuric acid is performed. The water vapor arising from such a concentration is directed according to the arrow F67a to a condenser 66 and then flows back in liquid form according to F68 to the filter 62 where it is incorporated in the manganese sulfate precipitate which it restores to solution and carries into the chamber 64. This solution is in turn recycled according to the arrow F69 to the base of the washing tower 56. It will be noted that the condenser 66 and the evporator 61 are maintained under low pressure by means of a vacuum pump 67.

Finally, the conduit F70 indicates that the air from the vacuum pump 67 which is likely to carry traces of solution is introduced into the base of the washing tower 56.

Such a process may be explained as follows:

At the commencement of the purifying process, a solution of manganese sulfate to which preferably a small quantity of manganese dioxide is added to encourage the onset of the reaction is introduced into the base of the tower 56.

Advantageously, such a solution is prepared in accordance with the previously described process.

This solution is, in the tower 56 (according to the arrow F56) brought into contact with gases which have been cleansed of soot and smoky charcoal in the pre-washing tower 52, then mixed with air and discharged from the chamber 54 according to the arrow F55. The sulfur dioxide in the fumes or gases dissolves in the solution forming a complex of formula $(Mn^{3+}(SO_3)_3)^{3-}$ or similar which, in the presence of oxygen in the air, produces at least one powerful oxidizing agent (perhaps a manganosulfate complex), which rapidly oxidizes the sulfur dioxide present in the solution in free, ionized or combined form, and converts it to sulfuric acid.

The sulfuric acid content of the washing solution therefore increases.

When this level reaches a predetermined value, therefore in a period of continuous operation, a flow of solution corresponding to the sulfur dioxide absorbed is extracted at the base of the tower 56. Consequently, the sulfuric acid content of the washing solution remains constant.

The solution thus extracted is passed to the pre-washing tower 52 according to F58 which ensures on the one hand elimination of the soot and charcoal carried by the gases entering according to F51 and moreover this solution undergoes a primary concentration so that the sulfuric acid content becomes approximately 40%.

The water vapor resulting from such a concentration is therefore carried towards the washing tower 56.

Moreover, in the pre-washing tower 52, there is a reduction by the sulfur dioxide of certain resultant manganese compounds of valences above $2^+$, for example, $Mn^{3+}$ and $Mn^{7+}$, which may in certain conditions prejudice the operational concentration-separation procedure or pollute the acid produced.

The solution extracted from the pre-washing tower 52 as previously indicated, passed according to F59 into the filter 59 where it is cleansed of soot and charcoal is again concentrated in the evaporator 61 to give at 65 sulfuric acid which is concentrated to approximately 80%. The manganese sulfate collected at 64 after filtering at 63 of the solution extracted continuously from the tower 52 receives according to F68 water emanating from the concentration and condensation at 66 as previously indicated. Such a solution is recycled to the tower 56 according to F69. It should likewise be noted that the sulfuric acid concentration results just from the heat in the fumes. In this way, it is possible to obtain at 45 a concentrated sulfuric acid which can be marketed without the need for any outside supply of additional heat.

In order to be specific but in no way implying any restriction, an example is given hereinafter of a gas-washing purifying unit made by the inventors according to the third embodiment according to the invention.

A boiler 50 consumes a No. 2 heavy fuel with a 3.5% sulfur content.

The gases and fumes issuing at 50 and penetrating the exchanger 51 are at a temperature of 160°, containing a 30% excess of air and have the following composition and rates of flow:

| | | | |
|---|---|---|---|
| $CO_2$ | : | 477 | cu. m/hr. |
| $H_2O$ | : | 369 | " |
| $N_2$ | : | 3347 | " |
| $O_2$ | : | 214 | " |
| $SO_2$ | : | 7.5 | " ; | in other words a total rate of flow of 4414 cu.m/hr.

The temperature of the gases emerging from the exchanger 51 is approximately 100° C. and the gases enter the pre-washing tower 52 from which they emerge again at a temperature of substantially 60°.

In the chamber 54, the gases and fumes receive air at a rate of 6000 cu.m/hr.

At the outlet from the chamber 54, the gases have the following compositions and rates of flow:

| | | | |
|---|---|---|---|
| $CO_2$ | : | 477 | cu. m/hr. |
| $H_2$ | : | 560 | " |
| $N_2$ | : | 8087 | " |
| $O_2$ | : | 1474 | " |
| $SO_2$ | : | 7.5 | " ; | in other words a total rate of flow of 10600 cu.m/hr.

The purified gases discharged from the tower 56 according to F57 have the composition and move at a rate substantially identical to those previously mentioned, with the exception of:

$SO_2$: 1 p. p. m. or 0.01 cu.m/hr.

In a period of continuous operation, the washing solution routed according to F56 has the following composition and rates of flow:

| | | |
|---|---|---|
| Manganese or equivalent $MnSO_4$ | | 20 g/l |
| $H_2SO_4$ | 150 ± | 10 g/l |
| | | 200 to 400 cu. m/hr. | for a rate of flow of 200 to 400 cu.m/hr.

The solution which is continuously recycled in the pre-washing tower 52 of F52 and ensuring intimate contact between the fumes and the washing solution has the following composition and rates of flow:

| | |
|---|---|
| Manganese or equivalent $MnSO_4$ | 60 g/l |
| $H_2SO_4$ | 500 g/l |
| for a rate of flow of | 100 cu. m/hr. |

The solution routed from the pre-washing tower 52 to the evaporator 61 has the same composition as above but the rate of flow is 65 l/hr.

The sulfuric acid is obtained at 65 at a rate of 20.8 l/hr. and has a density of 1.73, a concentration of around 80% and contains approximately 6 g/l $MnSO_4$, which will need to be replaced periodically.

The solution collected at 64 and recycled according to F69 circulates at the rate of 200 liters and 3.875 kg $MnSO_4$/hr.

Now, with regard to the various parts of the apparatus, these are made from materials capable of resisting attack from the various media utilized and are particularly made from polyvinyl chloride. Their main characteristics are set out below:

| | |
|---|---|
| Tower 52 | : Height 3 m, diameter 2 m, lined with Raschig rings over a height of 0.75 m. |
| Tower 56 | : Height 3 m, diameter 2.9 m, lined with Raschig rings over a height of 1 m. |
| Pump 57 | : Delivery 200 to 400 cu. m/hr. at 4 m height. |
| Pump 53 | : Delivery 100 cu. m/hr. at 4 m height. |

Filter 59 : Continuous type with automatic washing of the filter element.

Evaporator 61 : Concentrates $H_2SO_4$ to 80% under vacuum of 30 mmHg

Filter 63 : Of the drum or horizontal segment type.

Vacuum pump 67 : Delivery 100 cu.m/hr. under 30 mmHg

Exchanger 51 : Of the single-stage temperature type (160° and 110° C.). Heat-carrying liquid: oil Fan 55 : Delivery 6000 cu.m/hr. under 50 mm water.

It will be noted that operation of the pre-washing tower 52 not only eliminates the soot and charcoal carried by the fumes but also provides for primary concentration of the sulfuric acid to 40%. Such a feature makes it possible therefore to use only a single evaporator 61 and moreover to use a single-stage exchanger 51 which is therefore of less high thermal efficiency than if the pre-washing tower is not used.

As mentioned elsewhere, it has been observed that the reaction stops when the flow of sulfur dioxide exceeds a critical level, which depends on the working conditions. The oxidizing agents are then reduced and the manganese restored completely to the value $2^+$.

It would seem logical to think that the sulfur dioxide acts on the one hand as a means of promoting the formation of oxidizing agents and on the other acts as a means of reducing the oxidizing agents according to the working process. It would be understood therefore that if the sulfur dioxide concentration is too high, at a given point of the washing column, the oxidizing agents would be completely reduced and the purifying process would stop by itself.

In accordance with the present invention, the rate of flow of sulfur dioxide, or otherwise the rate of flow of gases and fumes to be purified, must be a function of a certain number of other parameters. The inventors have established that such a flow should be substantially proportional to the square on the oxygen concentration in the gases entering the columns or tower 5 (FIGS. 2 and 1) or 56 (FIG. 3).

Likewise, the inventors have also established that the flow of sulfur dioxide should be proportional to the volume of dynamic retention in the washing solution in the washing column or tower 5 or 56.

The overall relationship will be moreover explained hereinafter.

It is well-known that in the field of industrial chemistry the volume of dynamic retention (hereinafter referred to by the letters V.D.R.) is defined by the volume of liquid which is contained at any given time in an apparatus when this apparatus is being continuously supplied with the liquid.

Such a parameter depends particularly on the flow of liquid and on the equipment in the apparatus.

In the case of the washing tower 5 or 56 used according to the invention, therefore, the V.D.R. depends on the flow of washing solution and on the lining used in the tower. In particular, in the event of this lining consisting of Raschig rings, the V.D.R. is particularly proportional to their surface area.

In line with the foregoing considerations, one might therefore think that the flow of sulfur dioxide will become greater the higher the V.D.R. and the concentration of oxygen in the gases.

However, the losses of head increase likewise as a function of the V.D.R. and the flow rate of gas.

It is therefore necessary to fix a limit head loss level and regulate or better still optimize the main parameters of the process as a function of this level, it being understood that the purified gases discharged from the tower 5 or 56 according to F6 or F57 must not contain more than 20 p.p.m. of sulfur dioxide, such a value being virtually of the order of 1 p.p.m.

In the examples of embodiment which have just been described the inventors have fixed the level for head loss at 60 mm. water (which corresponds to a value normally admissible in a boiler) and have therefore determined those conditions which are optimum if one is to obtain a purified gas containing at most 20 p.p.m. sulfur dioxide.

Moreover, it is assumed that a number 2 heavy fuel containing 3.5% sulfur is consumed in the boiler.

Under these conditions, the inventors have established the following relationships:

$$D = 0.03 \, (O_2)^2 \times V.D.R. + A$$

in which D is the rate of flow of sulfur dioxide in liters per hour and per square meter of cross-section of washing tower or columns 5 or 56.

$(O_2)$ designates the concentration of oxygen in the gases and as a percentage at the intake to the tower 5 or 56 (comprised between 10 and 21% oxygen). V.D.R. is given in liters of solution per sq. m of cross-section of tower.

A is a constant which would correspond to the rate of flow of the sulfur dioxide directly oxidized by the oxidizing agents in the solution without previously forming coordinating complexes of the manganosulfitic type.

In the case of columns lined with Raschig rings, the value of A has in all cases been found to be of the order of 550 under normal conditions of operation.

On a basis of this relationship, established experimentally by the inventors, there now follows an explanation of the manner of optimizing the various parameters of the process according to the invention:

(a) First of all, a tower or column lining is established, characterized by its geometry and specific surface area, for example, Raschig rings of given dimensions.

(b) For various heights of lining, the rates of flow of gas and of solution which give a 60 mm WG loss of head are determined per unitary cross-section of column.

(c) The values of the V.D.R. of the lining per unit of cross-section are determined as a function of the rates of flow of solution for each height of lining.

(d) For each of the values for V.D.R. determined under (c), it is possible by means of the previous relationship, and as a function of the concentration of oxygen, to calculate the rates of flow of sulfur dioxide which can be oxidized under stable and effective conditions of operation.

(e) The maximum rate of flow of sulfur dioxide is all the greater, according to the previous relationship, the higher are the V.D.R. and the concentration of oxygen, but the loss of head rises as a correlated factor. Therefore, for each value of V.D.R., according to (d), (to which correspond the given rate of flow of solution and a given height of lining), the flow of gas is determined which gives a loss of head of 60 mm WG according to (b). According to (d), there is a limit flow of sulfur dioxide and an optimum oxygen concentration which correspond to this flow of gas.

(f) The values obtained according to (e) give the maximum unit rates of flow of sulfur dioxide for various values of the parameters: height of lining, concentration of oxygen in the gases, unitary flow of solution, while at the same time respecting the condition of 60 mm WG loss of head imposed by the operating characteristics of the boilers.

From the values according to $(e)$, that is chosen for which the rate of flow of sulfur dioxide is highest; definite values of the parameters: height of lining, concentration of oxygen and unitary flow of solution, correspond to this rate of flow.

(g) The values defined according to $(f)$ are related to a unitary cross-section of 1 sq.m. On a basis of these values, it is simple to calculate a purifying plant functioning under optimum conditins. If one considers, for example, a boiler giving a maximum given flow of sulfur dioxide (this flow possibly being determined by the maximum hourly consumption of fuel by the boiler and the maximum sulfur content in the fuel), the purifying plant will be calculated as follows:

height of lining = defined under $(f)$, concentration of oxygen in the gases = values defined under $(f)$ cross-section of the tower =

-continued $$1 \text{ sq. m} = \frac{\text{maximum flow of } SO_2 \text{ from the boiler}}{\text{maximum flow of } SO_2 \text{ according to } (f)}$$

rate of flow of solution = unitary flow per (f) x corss-section of the tower.

(h) The parameters according to (f) are a function of the characteristics of the linings (specific surface area, vacuum level). Thus, as the examples given below will show, the inventors have established that in the case of Raschig rings, the greater the surface area, the smaller are the volumes and heights of columns and the greater is the cross-section of the column. The choice of the lining will depend upon the local conditions of installation (height and surface area available in particular) and a function of economic considerations such as the prices of materials.

A few practical examples of an embodiment will be set out hereinafter.

EXAMPLE 1

Raschig rings are used with a diameter of 15 mm. and a height of 15 mm. Their specific surface area is 292 sq.m/cu.m.

Under optimum conditions:
The flow of sulfur dioxide is 1080 liters/hour/sq.m. of cross-section.
The total flow of gas entering the tower is 1300 cu.m/hr./sq.m. of cross-section.
Their concentration in oxygen is 13% by volume.
The lining height is 1 m.
The rate of flow of solution is 40 cu.m/hr/sq.m. of cross-section.

Therefore, for a plant consuming 300 kg/hr. of No. 2 fuel with a titre of 3.5% S, the washing tower has the following specifications:

Cross-section = 7 sq.m.
Diameter = 3 m.
Height of lining = 1 m.
Volume = 7 cu.m.
Rate of flow of solution = 230 cu.m/hr.

EXAMPLE 2

Raschig rings are used which have a diameter of 25 mm. and a height of 25 mm. Their specific surface area is 195 sq.m./cu.m.

Under optimum conditions:
The flow of sulfur dioxide is 1115 liters/hour/sq.m. of cross-section.
The total flow of gas entering the tower is 1560 cu.m./hr/sq.m. of cross-section.
Their concentration in oxygen is 13.5% by volume.
The height of lining is 1.40 m.
The rate of flow of solution is 50 cu.m/hr./sq.m. of cross-section.

Therefore, for a plant consuming 300 kg/hr. of No. 2 fuel with a titre of 3.5% S, the washing tower has the following specifications:

Cross-section = 6.7 sq.m
Diameter = 2.90 m
Height of lining = 1.4 m
Volume = 9.4 cu.m.
Rate of flow of solution = 335 cu.m./hr.

EXAMPLE 3

Raschig rings are used which have a diameter of 50 mm. and a height of 50 mm.

Their specific surface area is 98 sq.m./cu.m.
Under optimum conditions:
The flow of sulfur dioxide is:
1290 liters/hr./sq.m. of cross-section. The total flow of gas entering the tower is:
1835 cu.m./hr./sq.m. of cross-section Their concentration is oxygen is:
14% by volume. The height of lining is:
2.5 m. The total rate of flow solution is:
65 cu.m./hr./sq.m. of cross-section.

Therefore, for a plant consuming 300 kg/hr. of No. 2 fuel with a titre of 3.5% S, the washing tower has the following specifications:

Cross-section = 5.85 sq.m.
Diameter = 2.73 m.
Height of lining = 2.5 m.
Volume = 14.6 cu.m.
Flow of solution = 380 cu.m./hr.

EXAMPLE 4

No Raschig rings or any other lining are used but the washing solution is dispersed countercurrent against the gases in the tower. The conditions of dispersion correspond to a theoretical specific surface area of the lining of 66 sq.m./cu.m.

Under optimum conditions:
The rate of flow of sulfur dioxide is:
1940 liters/hr./sq.m. of cross-section
The total flow of gas entering the tower is:
3400 cu.m./hr./sq.m. of cross-section.
Their concentration is oxygen is:
15.2% by volume.
The column height is 4 m.
The flow of solution is:
100 cu.m./hr./sq.m. of cross-section.

Therefore, for a plant consuming 300 kg of No. 2 fuel per hour with a titer of 3.5% S, the washing tower has the following specifications:

Cross-section = 3.86 sq.m.
Diameter = 2.2 m.
Height of column = 4 m.
Volume = 1514 cu.m.
Flow of solution = 386 cu. m./hr.

Thus, in all cases, a maximum level of 20 p.p.m. of sulfur dioxide is obtained in the purified gases, the loss of head being 60 mm. water.

It is quite evident that in the examples given above, those conditions which are optimum for the purifying parameters may vary particularly in accordance with the local conditions of installation without thereby departing from the spirit of the invention. In particular, the heights and cross-sections of the washing towers may vary for a purifying unit, according to the conditions.

Therefore, the process according to the invention, in all its embodiments, makes it possible effectively to purify fumes and gases while producing from the sulfur derivatives extracted in this way a commercial concentrated sulfuric acid which is capable of being used directly for various applications and chemical processes. Of course, this acid carries traces of manganese sulfate which means that from time to time manganese oxides or sulfate require to be added.

It is likewise evident that several units of the type previously described may be associated in series or in parallel.

Likewise, instead of manganese, cobalt, nickel or their mixtures in various proportions may be used, or the reaction may be started with one element and then pass progressively to another, all within the spirit of the invention.

It must likewise be noted that in the process which is the object of the invention, the concentration of sulfuric acid may possibly be carried out by using not the heat of the fumes but the heat from any external heat source. In this case, the heat from the fumes may advantageously be used at the purified gas outlet in order to increase the velocity and so encourage rapid dispersion into the atmosphere.

It will be seen therefore that the method according to the invention makes it possible to achieve an effective purification of fumes of sulfuretted compounds while producing a concentrated sulfuric acid which can be used direct.

Practical applications can be found particularly in industrial boiler-rooms using fuels which may have a high content of sulfuretted derivatives.

Of course, the invention is by no means restricted to the embodiments described and illustrated, which has been given purely by way of example.

In particular, it is possible to make modifications of detail, change certain dispositions, composition, rates of flow and other parameters or replace certain means by equivalent means, without thereby departing from the scope of the invention.

What is claimed is:

1. A process for removing sulfur dioxide from a sulfur dioxide-containing gas comprising contacting said sulfur dioxide-containing gas and excess oxygen to oxidize the sulfur dioxide with an aqueous washing medium containing (1) $MnSO_4$, (2) sulfuric acid, and (3) complexes thereof formed in the presence of manganese dioxide, said medium exhibiting a maximum absorption in the visible spectrum at 480 and 500 nanometers, the concentration of sulfate, sulfuric acid, and the complexes in said medium corresponding to a composition obtained by preparing in an aqueous medium a homogeneous mixture comprising 0.5 to 10 g/l of manganese dioxide monohydrate, 20 to 500 g/l of manganese sulfate monohydrate, and 100 to 1,000 g/l of sulfuric acid, agitating the resultant composition for at least 30 minutes, diluting the composition so obtained so that the concentration of manganese sulfate therein is from 10 to 20 g/l and the concentration of sulfuric acid is at least 100 g/l.

2. The process of claim 1, wherein the amount of oxygen is supplied by mixing oxygen with said sulfur dioxide-containing gas and is sufficient to maintain the valences of at least some of the manganese ions in said aqueous washing medium to above the +2 valence state.

3. The process according to claim 2, in which a fraction of said aqueous washing medium corresponding to the sulfur dioxide absorbed is removed from contact with said sulfur dioxide-containing gas immediately after absorption of said sulfur dioxide and replaced by a corresponding quantity of fresh aqueous washing medium so that the sulfuric acid concentration in the washing solution is kept constant, said fraction of aqueous washing medium being cleansed of solid particles contained therein by filtration and concentrated under reduced pressure so that $MnSO_4$ is precipitated said precipitated $MnSO_4$ being separated from the concentrated sulfuric acid.

4. The process according to claim 3, wherein at least a part of said sulfur dioxide-containing gas is allowed to bubble through said fraction of washing solution after said filtration.

5. The process according to claim 4, wherein after bubbling, the part of the sulfur dioxide containing gas bubbled through the aqueous washing medium is mixed with the remaining sulfur dioxide-containing gas after said remaining sulfur dioxide-containing gas has been mixed with air.

6. The process according to claim 4, wherein after bubbling, the part of the sulfur dioxide-containing gas bubbled through the aqueous washing medium is mixed with the remaining sulfur dioxide-containing gas prior to mixture of said remaining sulfur dioxide-containing gas with air.

7. The process according to claim 2, wherein prior to introduction of oxygen into said sulfur dioxide-containing gas, said sulfur dioxide-containing gas is pre-washed for eliminating the soot and smoky charcoal carried therein, said sulfur dioxide-containing gas being pre-washed with a fraction of said aqueous washing medium.

8. The process according to claim 7, wherein said fraction of aqueous washing medium for eliminating the soot and charcoal is in succession concentrated during the course of said pre-washing, cleansed of said soot and charcoal by filtering, and thereafter concentrated again under low pressure, so that $MnSO_4$ is precipitated said $MnSO_4$ being separated from the concentrated sulfuric acid produced by concentrating said fraction of aqueous washing medium.

9. The process according to claim 1, wherein at intervals of approximately 30 to 60 minutes one quarter to one half of the total volume of aqueous washing medium is withdrawn from contact with said sulfur dioxide-containing gas and left to stand at least about 1 hour and is then reintroduced into contact with said sulfur dioxide-containing gas.

10. The process of claim 1, wherein said aqueous washing medium is contacted with said gas in a tower, a portion of said aqueous washing medium being periodically withdrawn from said tower, said portion of said aqueous washing medium being left to stand for at least one hour and thereafter returned to said tower.

11. The process of claim 1, wherein the concentration of sulfuric acid in said aqueous washing medium is maintained essentially constant.

12. The process of claim 11, wherein a portion of said aqueous washing medium is withdrawn from contact with said gas and fresh aqueous washing medium is provided for contact with said gas so that the concentration of said aqueous washing medium contacting said gas is maintained essentially constant.

13. The process of claim 1, wherein the sulfur dioxide absorbed in said aqueous washing medium is oxidized to sulfuric acid and after the rate of oxidation of the sulfur dioxide to sulfuric acid has substantially decreased a portion of the washing medium is removed from contact with said sulfur dioxide-containing gas and allowed to stand for about 1 hour to regain the initial oxidation activity, the increase in oxidation activity being shown by the increase in optical density of said medium.

14. The process according to claim 1, wherein the concentration of sulfuric acid in said aqueous washing medium is from 140 to 500 g/l.

15. A process for removing sulfur dioxide from a sulfur dioxide-containing gas comprising contacting said sulfur dioxide-containing gas and excess oxygen to oxidize the sulfur dioxide with an aqueous washing medium consisting essentially of (1) $Mn^{+2}$, (2) $H_2SO_4$ and (3) complexes thereof formed in the presence of manganese dioxide, said aqueous washing medium exhibiting a maximum absorption in the visible spectrum at 480 to 500 nanometers, the concentration of $Mn^{+2}$, $H_2SO_4$ and said complexes in said medium corresponding to an aqueous solution containing 10 to 20 g/l manganese sulfate and at least 100 g/l sulfuric acid.

16. The process of claim 15, wherein the amount of oxygen is supplied by mixing the oxygen with said sulfur dioxide-containing gas and is sufficient to maintain the valences of at least some of the manganese ions in said aqueous washing medium at above the +2 valence state.

17. The process according to claim 15, wherein the concentration of sulfuric acid in said aqueous washing medium is from 140 to 500 g/l.

18. A process for removing sulfur dioxide from a sulfur dioxide-containing gas, comprising contacting said sulfur dioxide-containing gas and excess oxygen to oxidize the sulfur dioxide with an aqueous washing medium consisting essentially of (1) +2 valence ions of an element M wherein M is selected from the group consisting of Mn, Co and Ni, (2) $H_2SO_4$ and (3) the complexes thereof formed in the presence of the corresponding dioxide of element M selected from the group consisting of $MnO_2$, $CoO_2$ and $NiO_2$, the concentration of +2 valence ions of the element M, and $H_2SO_4$ in said aqueous washing medium corresponding to a solution containing 10 to 20 g/l of the sulfate of element M and at least 100 g/l sulfuric acid.

19. The process according to claim 18, wherein the concentration of sulfuric acid in said aqueous washing medium is from 140 to 500 g/l.

* * * * *